July 6, 1926.  1,591,437
D. A. SARGENT
CARRYING DEVICE FOR TRACTOR SNOWPLOWS
Filed Sept. 29, 1925   2 Sheets-Sheet 2
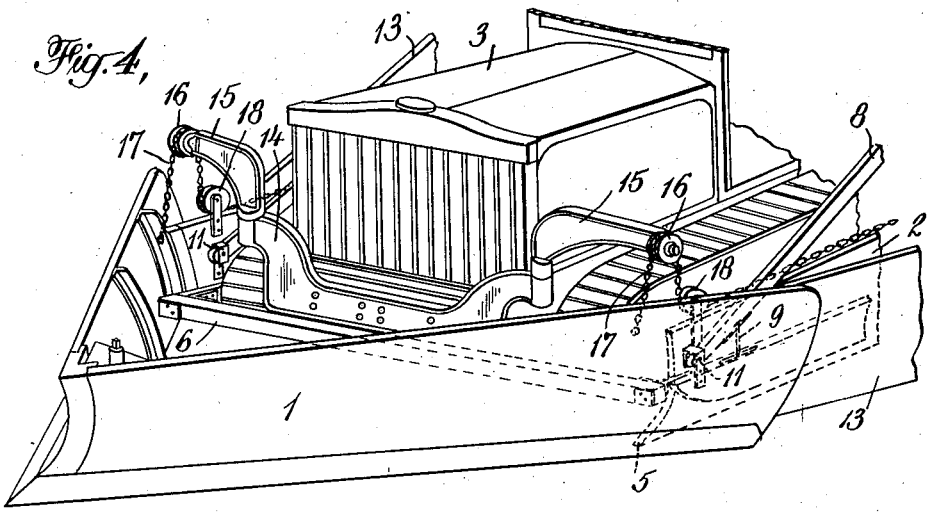
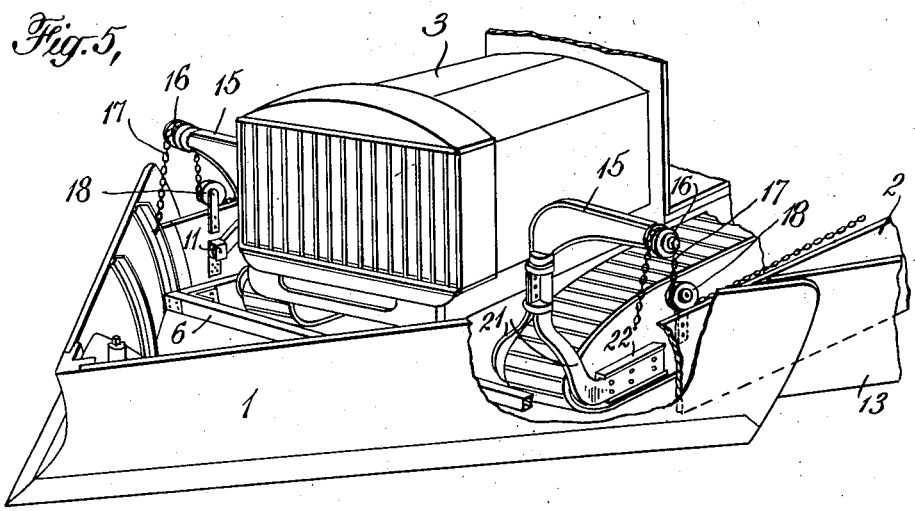
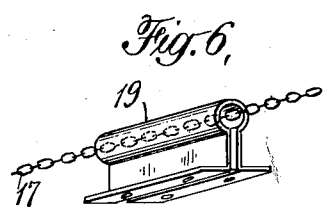
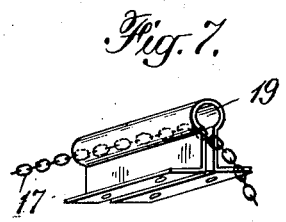
INVENTOR
Don A. Sargent
BY
Pennie, Davis, Marvin & Edmonds
his ATTORNEYS Patented July 6, 1926.

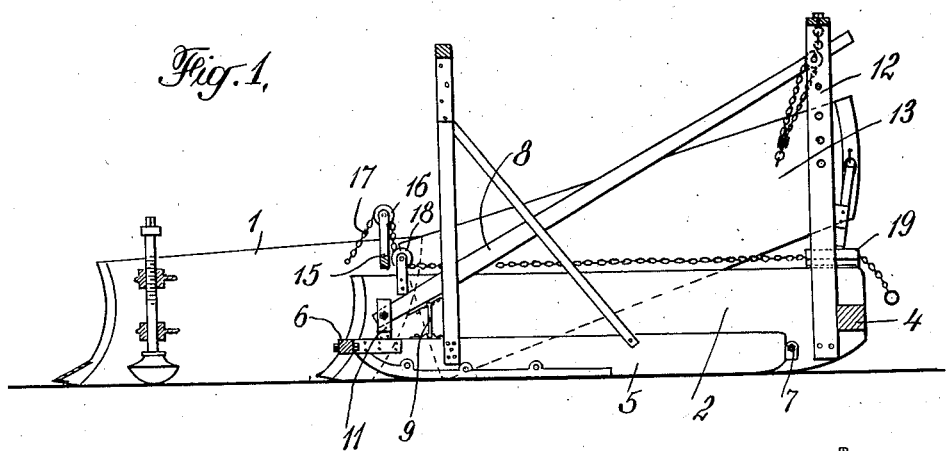
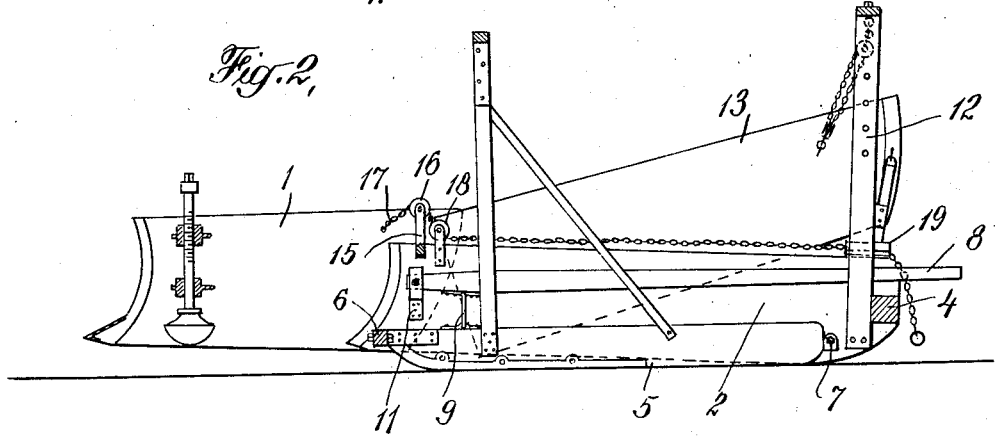
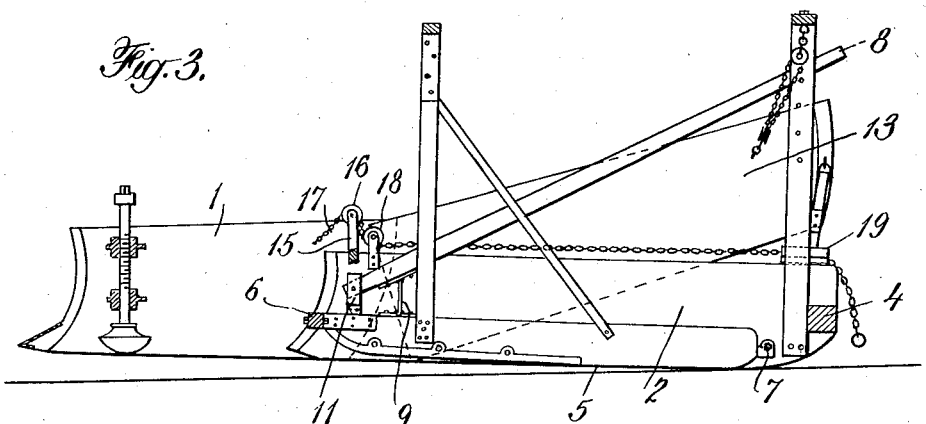

1,591,437

UNITED STATES PATENT OFFICE.

DON A. SARGENT, OF BANGOR, MAINE, ASSIGNOR TO NORTHERN TRAILER COMPANY, OF BANGOR, MAINE, A CORPORATION OF MAINE.

CARRYING DEVICE FOR TRACTOR SNOWPLOWS.

Application filed September 29, 1925. Serial No. 59,266.

This invention relates to snow plows, particularly roadway snow plows of the tractor driven type. In my Patent No. 1,550,573 I have illustrated and described a snow plow of this type provided with an angular nose to which is secured a rearwardly extending frame supported upon sled runners and designed to receive a tractor preferably of the caterpillar or traction belt type. The frame is completed at the rear by means of a removable draw bar to which the tail of the tractor is connected. During the operation of plowing snow therefore the plow is supported independently of the tractor. In transporting the plow from place to place over bare roads the wear and tear upon the plow when dragged along supporting its own weight is considerable. It is therefore the object of the present invention to provide means for supporting the plow upon the tractor for transportation and thus eliminating, or at least greatly reducing, the wear upon the plow and the power expended in transporting it over bare roads.

In the plow illustrated in my patent above referred to I have provided means for elevating the nose of the plow by pivoting the frame upon the supporting sled runners. This elevation of the nose has a distinct function in the plowing of snow and enables me to vary the depth of the cut and also enables me to pass over obstructions in the roadway without difficulty. I utilize this elevating mechanism in attaining the object of the present invention, by providing the forward end of the tractor with laterally extending arms intended to receive the weight of the plow when the nose is in elevated position. I secure the plow to these arms preferably by means of a pair of chains fastened to the nose, passing over the supporting arms, under a sheave mounted on the frame just behind the arms, and thence to the rear of the frame where anchoring means are provided. After the nose is thus suspended the sled is raised and thus the entire plow is hung upon and supported by the tractor. The rear ends of the frame and sled do drag along the ground, but as most of the weight of the plow is carried by the tractor this is of no great consequence.

In the accompanying drawings I have illustrated certain preferred embodiments of my invention to which I shall now refer in order to explain more fully the principles involved. In these drawings Figures 1, 2 and 3 are longitudinal sections through a snow plow equipped with the plow supporting elements of the present invention. In none of these figures is the tractor itself shown, although a fragment of the outer end of one of the supporting arms on the tractor is illustrated. In Figure 1 the plow is shown resting upon the ground and in position for plowing; in Figure 2 the nose is illustrated in elevated position having been pivoted upon the sled, and in Figure 3 the sled itself has been raised so that the entire plow is hung upon the tractor and is in readiness for transportation. Figure 4 is a perspective view of the forward end of a plow and tractor showing the manner in which the plow is supported upon the tractor. Figure 5 is a similar view illustrating the use of a tractor of a different type. Figures 6 and 7 are details of the means for anchoring the supporting chains at the rear of the frame.

The plow illustrated in the drawings is provided with a V-shaped nose 1, the sides or shares of which are made concave. Extending rearwardly from this nose are a pair of side members 2 rigidly secured to the nose and forming therewith an open-ended frame designed to receive a tractor 3. The rear end of this frame is completed by means of the transverse draw-bar 4 through which the plow is drawn by means of the tractor. Within the frame and designed to support both it and the nose, is a sled comprising two runners 5 connected at their forward ends by means of a cross-bar 6. The frame is pivotally connected to the sled at two points 7. In order to raise the nose of the plow, I have provided a pair of levers 8, one on each side of the frame. These levers are fulcrumed upon the forward ends of the runners 5 by means of links 9, and their forward ends are secured to the side members 2 of the frame by means of brackets 11. To tip the nose of the plow, the operator bears down upon the rear ends of levers 8 and as the leverage is considerable, has no difficulty in causing the frame and nose to swing upward about the points 7 as illustrated in Figure 2. The elevation once attained is held by means of pins passing through uprights 12 mounted on the rear of the frame. The plow is also preferably provided with auxiliary side shares or wings 13 adjustable vertically and laterally. The foregoing describes briefly the plow illustrated in my Patent No. 1,550,573.

The present invention relates to means for supporting the plow upon the tractor for transportation and I shall now describe the means by which I accomplish this end. The tractor 3 illustrated in Figure 4 is a Holt tractor. To the forward end of the frame of this tractor, just below the radiator, I secure a bracket casting 14 and on the outer ends of this casting I mount a pair of swiveled arms 15 provided at their outer ends with sheaves or rollers 16. It is from these arms that the plow is to be supported. Chains 17 are fastened to the nose adjacent the forward ends of the side member 2, one chain on each side of the plow. These chains extend upward and rearward over the sheaves 16, thence downward and under sheaves or rollers 18 mounted on the side member 2, thence to the rear of the frame and through grabs 19. During normal snow plowing operation the arms 15 may be swung inward and the chains removed from the sheaves 16 and permitted to lie idle along the side members 2.

When it is desired to transport the plow by means of the tractor, the arms 15 are swung outward, and the chains 17 placed over the sheaves 16. The parts then occupy the position shown in Figure 1. The levers 8 are then moved downward, pivoting the frame and the nose upon the sleds as shown in Figure 2. When the plow is in this position the chains 17 are drawn taut and anchored by forcing them downward in the grabs 19, as illustrated in Figure 7. When in this position the levers 8 are released, the major part of the weight of the nose and frame is borne directly by the tractor through the arms 15. Although this relieves the sled of the weight of the frame and nose, the sled itself can be lifted free of the ground by positively moving the levers 8 upward and holding them in that position as illustrated in Figure 3. In this upward movement of the levers 8, the brackets 11 remain fixed and hence act as the fulcrums, the sled being raised through the links 9. The sled is then supported directly by the frame itself and indirectly by the tractor.

In Figure 5 I have illustrated a Best tractor provided with plow supporting means. In the case of this tractor, it is not feasible to use the bracket casting 14 which can be readily applied to the Holt tractor and I therefore provide castings 21 bolted to the tractor channels 22 on each side of the tractor. These castings 21 perform the function of the bracket casting 14 and support swiveled arms 15 which function as described above.

I claim:

1. The combination with a tractor of a snow plow comprising a sled, a plow nose pivotally connected with the sled, means for swinging the nose relative to the sled to raise and lower the nose and means for hanging the nose on the tractor when in raised position.

2. The combination with a tractor of a snow plow comprising a sled, a plow nose mounted thereon for movement in a vertical plane, means for securing the nose to the tractor when in raised position whereby the weight of the nose is carried by the tractor, and means for supporting the sled from the frame.

3. The combination with a tractor of a snow plow comprising a sled, a frame pivotally connected to the sled and designed to receive the tractor, a nose secured to the frame and means for supporting the frame and sled upon the tractor for transportation.

4. The combination with a tractor of a snow plow comprising a sled, a frame pivotally connected to the sled and designed to receive the tractor, a nose secured to the frame, and means for suspending the forward ends of the frame and sled from the forward end of the tractor for transportation.

5. The combination with a tractor of a snow plow comprising a sled, a frame pivotally connected to the sled and designed to receive the tractor, a nose secured to the frame, a draft connection between the plow and the tractor, means for pivoting the frame upon the sled to raise and lower the nose, and means for securing the frame to the tractor when in raised position and removing the weight from the sled so that the frame is supported by the tractor.

6. The combination with a tractor of a snow plow comprising a sled, a frame designed to receive the tractor pivotally connected to the sled for movement in a vertical plane, a nose secured to the frame, a draft connection between the plow and the tractor, a sheave mounted on the frame, an arm on the tractor, a chain secured to the nose and designed to pass over the arm on the tractor and under the sheave on the frame, and means for securing the other end of the chain when the frame is in raised position whereby the weight of the frame is transferred from the sled to the tractor.

7. The combination with a tractor of a snow plow comprising a sled, a frame pivoally connected thereto for receiving the tractor, a nose on the frame, a draw-bar at the rear of the frame, a draft connection between the draw-bar and the tractor and a lever on each side of the plow fulcrumed near the forward end of the sled and connected with the frame for pivoting the frame upon the sled to raise and lower the nose, laterally extending arms on the forward end of the tractor, sheaves on the arms, sheaves mounted upon the frame just behind the arms, chains secured to the nose passing over the sheaves on the arms and under the sheaves on the frame and means for securing the ends of the chains to the frame.

In testimony whereof I affix my signature.

DON A. SARGENT.